(12) United States Patent
Wang

(10) Patent No.: US 10,167,219 B2
(45) Date of Patent: Jan. 1, 2019

(54) ECOLOGICAL BIOWATER PURIFICATION SYSTEM

(71) Applicant: Thomas Wang, New Taipei (TW)

(72) Inventor: Thomas Wang, New Taipei (TW)

( * ) Notice: Subject to any disclaimer, the term of this patent is extended or adjusted under 35 U.S.C. 154(b) by 171 days.

(21) Appl. No.: 15/272,052

(22) Filed: Sep. 21, 2016

(65) Prior Publication Data

US 2018/0079671 A1 Mar. 22, 2018

(51) Int. Cl.

| | | |
|---|---|---|
| *B01D 21/00* | (2006.01) |
| *C02F 1/00* | (2006.01) |
| *C02F 9/00* | (2006.01) |
| *C02F 1/32* | (2006.01) |
| *C02F 3/28* | (2006.01) |
| *B01D 21/24* | (2006.01) |
| *C02F 101/16* | (2006.01) |
| *C02F 101/10* | (2006.01) |

(52) U.S. Cl.
CPC ............ *C02F 9/00* (2013.01); *B01D 21/0012* (2013.01); *B01D 21/0042* (2013.01); *B01D 21/2411* (2013.01); *B01D 21/2461* (2013.01); *C02F 1/004* (2013.01); *C02F 1/32* (2013.01); *C02F 3/2806* (2013.01); *C02F 2001/007* (2013.01); *C02F 2101/105* (2013.01); *C02F 2101/16* (2013.01); *C02F 2301/046* (2013.01); *C02F 2303/04* (2013.01)

(58) Field of Classification Search
CPC .. Y02W 10/18; C02F 9/00; C02F 1/32; C02F 3/06; C02F 3/12; C02F 3/30; C02F 11/02; C02F 1/004; C02F 3/121; B01D 21/0012; B01D 21/0042; B01D 21/2411; B01D 21/2461
USPC ............ 210/605, 151, 195.3, 202, 194, 805
See application file for complete search history.

(56) References Cited

U.S. PATENT DOCUMENTS

| | | | | |
|---|---|---|---|---|
| 5,736,047 A | * | 4/1998 | Ngo .......................... | C02F 3/12 |
| | | | | 210/170.08 |
| 2007/0114174 A1 | * | 5/2007 | Peeters ................... | C02F 3/006 |
| | | | | 210/605 |

* cited by examiner

*Primary Examiner* — Claire A Norris
(74) *Attorney, Agent, or Firm* — Rabin & Berdo, P.C.

(57) ABSTRACT

An ecological biowater purification system includes at least one water purification tank, each water purification tank including a water inlet, a water outlet, a water purification device, a suction device, a first backflow device and a second backflow device. In particular, the water purification device includes, in order, a sedimentation pool, an anaerobic pool, an anoxic pool, a level-1 and a level-2 biological filter pool, which communicate with one another via baffle boards and communication holes. Each suction device includes a plurality of suction nozzles and suction pipes for discharging precipitates out of the respective water purification tanks. The first backflow device is used to make some water in the level-2 biological filter pool flow back to the sedimentation pool, and the second backflow device is used to make some water in the level-1 and level-2 biological filter pools flow back to the anaerobic pool.

20 Claims, 6 Drawing Sheets

ECOLOGICAL BIOWATER PURIFICATION SYSTEM

TECHNICAL FIELD

The present invention relates to a wastewater treatment system, in particular to an ecological biowater purification system.

BACKGROUND

With swift advance of economy, significant increase of population and rapid development of industry and agriculture, industrial wastewater, agricultural wastewater and domestic wastewater are gradually increasing day by day. Currently, a large amount of agricultural wastewater, industrial wastewater, agricultural wastewater and domestic wastewater is directly discharged into rivers, lakes, oceans and other water bodies without any treatment; accordingly, these water bodies include various pollutants with complicated compositions, which seriously damages the ecological balance of these water bodies, and then results in various environmental, economic and social losses.

For the purpose of solving the problem that the water bodies are currently seriously polluted, environmental workers have been actively searching solutions. The first kind of current available treatment method is to reduce pollution sources so as to control point source pollution and diffused pollution; however, the method only depends on the self-purification ability of the water bodies, and the water bodies need a lot of time to recover. The second kind of current available treatment method is to establish a large ecological park, which can clean pollutants by water plants; however, the method needs a lot of land area, which limits its application range; besides, the water bodies of the method are of low flow speed, as the method needs more time to purify water. The third kind of current available treatment method is to clean the mud at the bottoms of the water bodies and re-inject water into the water bodies, which can remove the mud including pollutants to clean the inner sources polluting the water bodies, and provide water with better quality to increase the self-purification ability and environment capacity of the water bodies. However, the above methods can just temporarily purify the water bodies, but cannot permanently solve the pollution problem; further, the construction of these methods is a huge task, which needs a lot of time and manpower; thus, these methods cannot efficiently purify the water bodies.

SUMMARY

In view of the shortcomings of prior art, the present invention provides a low-cost and high-performance ecological biowater purification system capable of being flexibly and conveniently operated.

The present invention is to properly filter a water body to promote the propagation of water microorganisms and enhance the self-purification ability of the water body; the major technical measure is to provide an ecological biowater purification system including a plurality water purification tanks connected to one another, and the water purification tank includes a water inlet, a water outlet, a water purification device, a suction device, a first and a second backflow device. The water purification device includes a plurality of water purification pools between the water inlet and the water outlet, and communicating with one another. The water purification pools are orderly arranged and include a sedimentation pool, an anaerobic pool, an anoxic pool, a level-1 biological filter pool and a level-2 biological filter pool. The sedimentation pool communicates with the water inlet, and the level-2 biological filter pool communicates with the water outlet, and there is a baffle board and a communication hole between any two adjacent water purification pools, whereby the water purification pools orderly communicate with one another. Each of the water purification pools is provided with a carrier capable of being conveniently replaced, and the carrier is used to be loaded with a stuffing material for water purification. The suction device includes a plurality of suction nozzles and a suction pipe; the suction nozzles are respectively disposed on bottoms of the water purification pools, and respectively connected to the suction pipes so as to discharge precipitates out of the water purification pools. The first backflow device makes some water in the level-2 biological filter pool flow back to the sedimentation pool by a water pump thereof. The second backflow device makes some water in the level-1 biological filter pool and the level-2 biological filter pool flow back to the anaerobic pool by a water pump thereof.

According to the above structure, the carriers of the sedimentation pool, the anaerobic pool and the anoxic pool are respectively provided with a plurality of holders used to hang a plurality of plastic flexible stuffing materials for water purification.

According to the above structure, the carrier of the level-1 biological filter pool is provided with a filamentous fiber net stuffing material for water purification.

According to the above structure, the carrier of the level-2 biological filter pool is provided with a biochemical ceramic ring stuffing material for water purification.

According to the above structure, the baffle boards and the communication holes between the water purification pools are arranged alternatively in the vertical direction.

According to the above structure, the bottom of each of the water purification pools has a downgrade and an upgrade, and the suction nozzle thereof is disposed at a lowest position.

According to the above structure, the sedimentation pool is provided with a plurality of curved water deflectors connected to lateral walls of the sedimentation pool to form streamline wall surfaces, and the water inlet is an inclined opening, whereby the water flow is able to be injected into the sedimentation pool by a predetermined angle and streams along the streamline wall surfaces to form the vortex flow.

According to the above structure, the anaerobic pool and the anoxic pool are provided with the curved water deflectors connected to lateral walls of the anaerobic pool and the anoxic pool to form streamline wall surfaces, whereby the vortex flow injected from the sedimentation pool is able to be continued and stream into the anaerobic pool and the anoxic pool.

According to the above structure, the water inlet is further provided with a grating for filtering out suspended matters in the water flow.

According to the above structure, the ecological biowater purification system further includes a disinfection device disposed between the level-2 biological filter pool and the water outlet so as to disinfect the water flow by ultraviolet light after the water flow is purified.

According to the aforementioned systematic structure, the present invention can achieve the following beneficial effects:

(1) The ecological biowater purification system according to the present invention includes a plurality of water purification tanks connected to one another, which integrate the sedimentation pool, the anaerobic pool, the anoxic pool, the level-1 biological filter pool and the level-2 biological filter pool by a tank body, so the structure is compact, easily and conveniently operated, of small size, and easily to be maintained.

(2) The ecological biowater purification system according to the present invention can provide great purification treatment effect, be flexibly and conveniently operated, of low cost and can be applied to rivers, lakes, oceans, flesh water farms, and the tail water re-treatment of sewage disposal plants; therefore, the system can be conveniently used and has wide application range.

(3) The carriers and the stuffing materials for filtering of the ecological biowater purification system according to the present invention are replaceable, which can be taken out and replaced at any time; besides, the aeration device can promote the combination of water and oxygen in the air to obviously the oxygen content of water.

(4) In the ecological biowater purification system according to the present invention, the baffle boards and the communication holes are alternatively arranged in the vertical direction, which can increase the treatment area and better the purification treatment effect; besides, according to the present invention, the anoxic pool is orderly connected to two biological filter pools, which can improve the self-purification ability of the water body and better the quality of the discharged water.

Further scope of applicability of the present application will become more apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
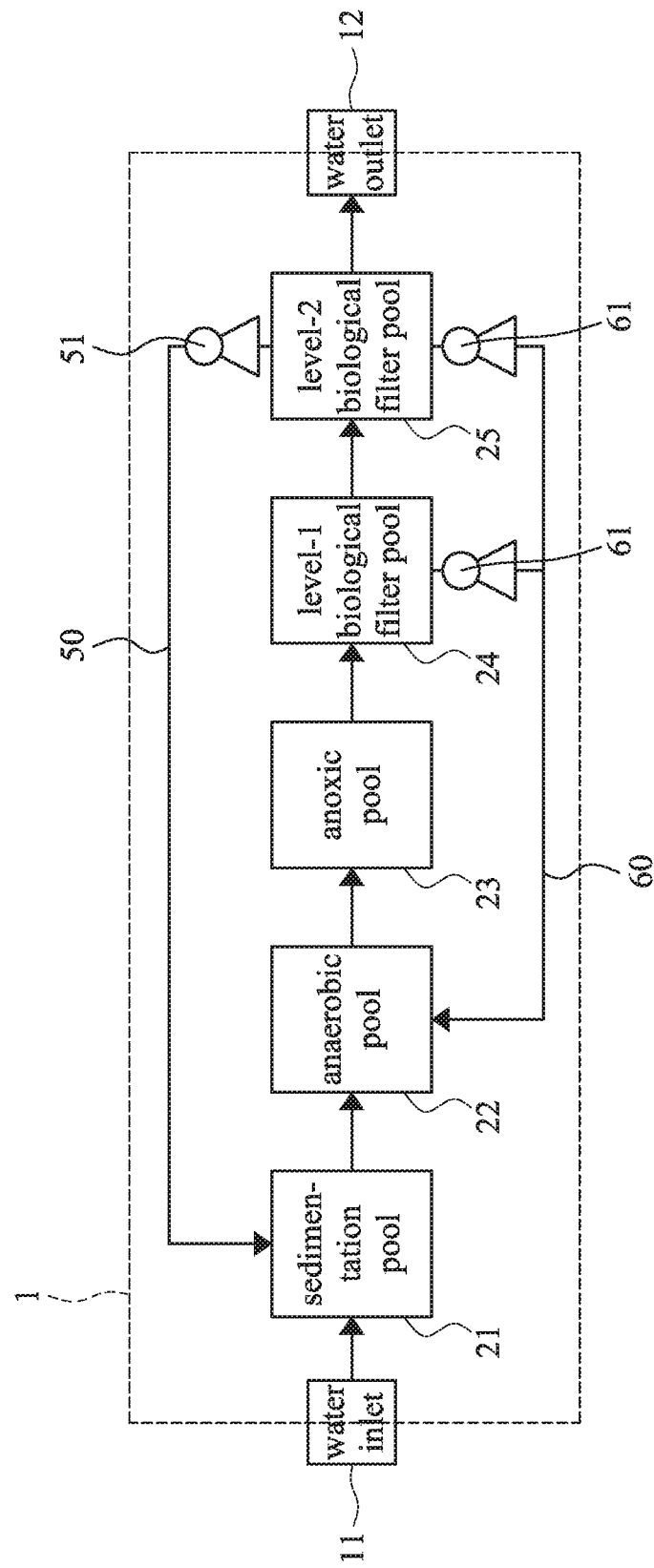
FIG. 1 is a schematic view of a preferred embodiment of a basic structure of a water purification tank in accordance with the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The water purification system majorly includes one or more water purification tanks 1 connected to one another; as shown in FIG. 1, which is a schematic view of a preferred embodiment of a basic structure of a water purification tank in accordance with the present invention; each of the water purification tanks 1 are provided with a water inlet 11 and a water outlet 12, and the water purification system of the water purification tank 1 majorly includes a water purification device, a first backflow device 50 and a second backflow device 60.

Figure 2:
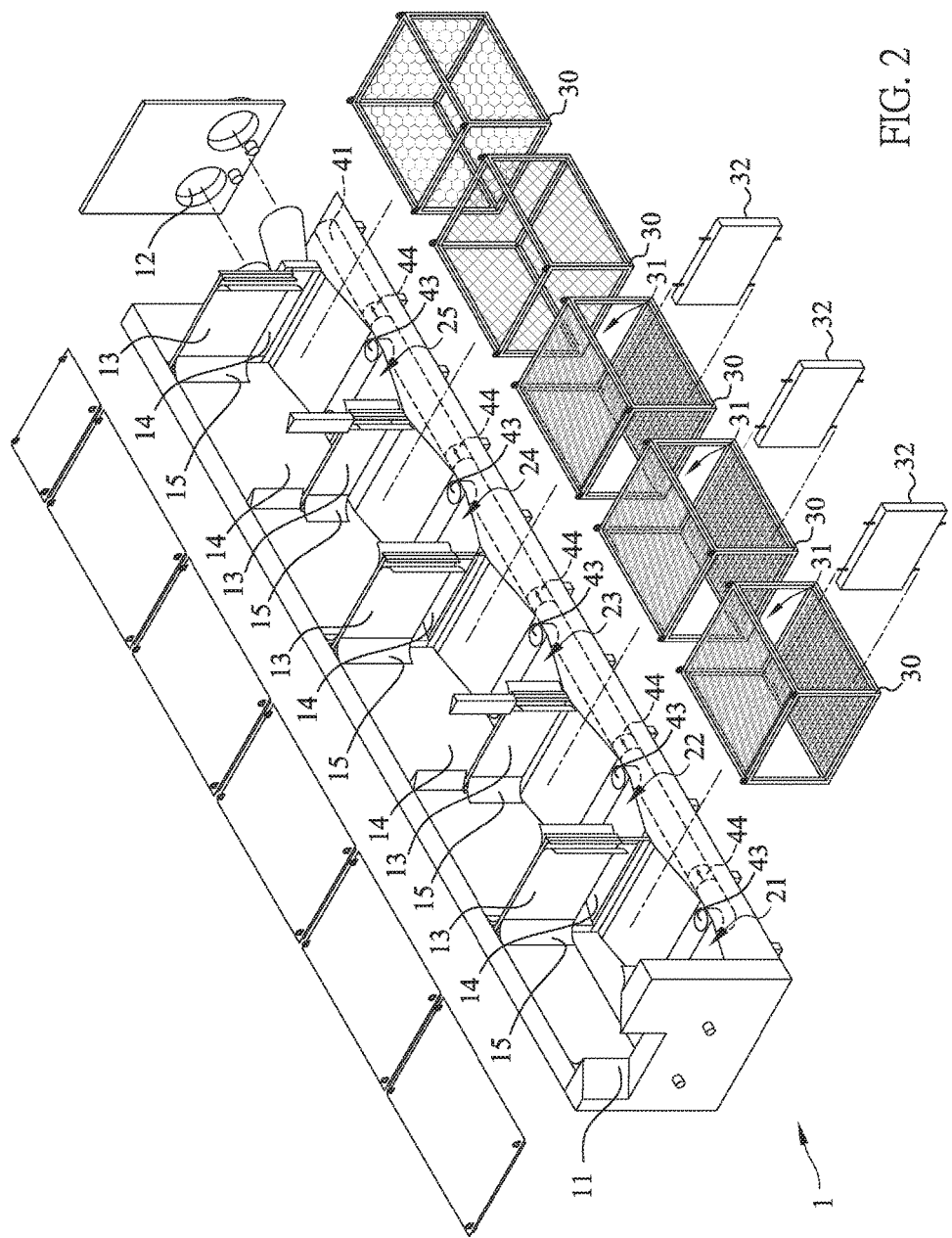
FIG. 2 is 3D schematic view of the preferred embodiment of the water purification tank in accordance with the present invention.
Figure 3:
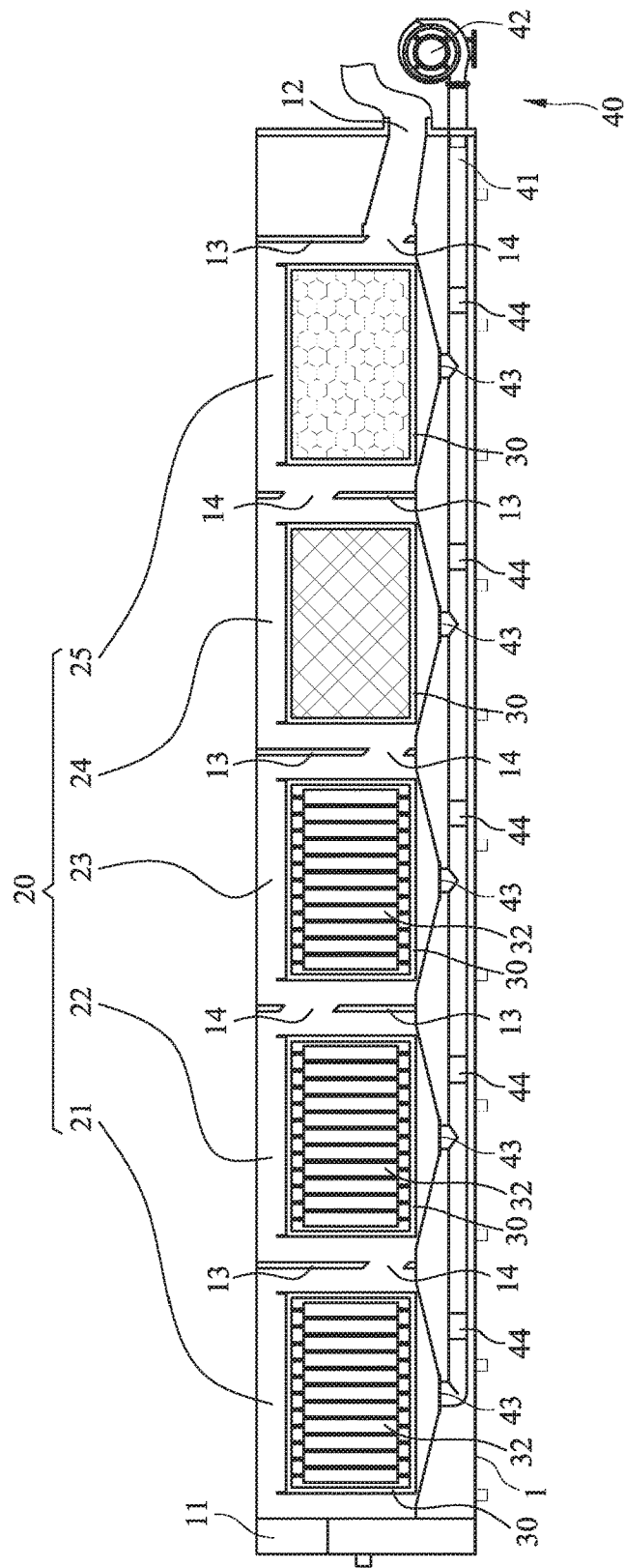
FIG. 3 is a structure schematic view of the preferred embodiment of the water purification tank in accordance with the present invention.

Please further refer to FIG. 2 and FIG. 3, the water purification device 20 is disposed between the water inlet 11 and the water outlet 12, and orderly includes a plurality of water purification pools; in the embodiment, the water purification pools are orderly arranged and include a sedimentation pool 21, an anaerobic pool 22, an anoxic pool 23, a level-1 biological filter pool 24 and a level-2 biological filter pool 25. The sedimentation pool 21 communicates with the water inlet 11, and the level-2 biological filter pool 25 communicates with the water outlet 12, and there is a baffle board 13 and a communication hole 14 between any two adjacent water purification pools (between the sedimentation pool 21 and the anaerobic pool 22, the anaerobic pool 22 and the anoxic pool 23, the anoxic pool 23 and the level-1 biological filter pool 24, the level-1 biological filter pool 24 and a level-2 biological filter pool 25), whereby the water purification pools orderly communicate with one another. Each of the water purification pools is provided with a carrier 30 capable of being conveniently replaced, and the carrier 30 is used to be loaded with a stuffing material for water purification. The water purification concept of the present invention is to perform the rough-filtering process via the sedimentation pool 21, which can filter out suspended matters and larger particles from the wastewater. Next, the wastewater flows into the anaerobic pool 22 to be treated by the fine-filtering process to filter out the smaller particles from the wastewater; meanwhile, phosphorus in the wastewater can be released, and dissolved organic matters can be used by microorganisms to reduce the COD, BOD and ammonia concentration in the wastewater. Then, the wastewater flows into the anoxic pool 23 to be treated by the micro-filtering process; denitrlfiers can use organic matters as carbon sources in order to remove some nitrogen from the wastewater. Afterward, the wastewater flows into the level-1 biological filter pool 24; the filamentous fiber net stuffing materials inside the pool can provide breeding places for the denitrlfilers to propagate; the interaction between the microorganisms on the stuffing materials and the microorganisms flowing through the wastewater can remove most COD, BOD and some ammonia. Finally, the wastewater flows into the level-2 biological filter pool 25; the biochemical ceramic ring stuffing materials not only have large specific surface area and high porosity, but also have better chemical and physical stability; for the reason, the microorganisms tend to significantly multiply, and then completely nitrify the ammonia in the wastewater; besides, COD and BOD can be further degraded, and the phosphors in the wastewater can be removed at the same time; therefore, the wastewater can be obviously purified.

The first backflow device 50 includes a water pump 51 and a pipe communicating with the sedimentation pool 21 and the level-2 biological filter pool 25, which can make the water purified by the level-2 biological filter pool 25 flow back to the sedimentation pool 21 so as to allow the microorganisms in the level-2 biological filter pool 25 to significantly multiply; thus, the water with great self-purification ability can flow back to the sedimentation pool 21, which can enhance the self-purification ability of the sedimentation pool 21. Similarly, the second backflow device 60 also has a water pump 51 and a pipe communicating with the anaerobic pool 22, the level-1 biological filter pool 24 and the level-2 biological filter pool 25, which can make the water purified by the level-1 biological filter pool and the level-2 biological filter pool flow back to the anaerobic pool 22; thus, the water with great self-purification ability can flow back to the anaerobic pool 22, which can enhance the self-purification ability of the anaerobic pool 22.

In addition, the water purification tank 1 is provided with a suction device 40, which includes a plurality of suction nozzles 43, a suction pipe 41 and a suction pump 42. Besides, the bottom of each of the water purification pools has a downgrade and an upgrade, such that the filtered particles can be collected at the lowest position. Each of the suction nozzles 43 is disposed at the lowest position. The suction pipe 41 is disposed at the bottom of each of the water purification pools, and has a plurality of connection holes respectively connecting to each of the suction nozzles 43, and communicating with the space outside the water purification tank 1. The suction pump 42 can draw and discharge the precipitates in each of the water purification pools outside the water purification tank, and the precipitates can be collected and then properly handled. In a feasible embodiment, the suction pipe 41 can has a back pressure valve 44 in the vicinity of each of the suction nozzles 43 in order to prevent the precipitates flow back to influence the purification quality of the water purification device 20.

In the embodiment, each of the water purification pools can be provided with a carrier 30 for containing the filtering stuffing materials. More specifically, the carrier 30 of each of the sedimentation pool 21, the anaerobic pool 22 and the anoxic pool 23 is substantially shaped to be a frame with a plurality of holders 31 used to hang a plurality of plastic flexible stuffing materials 32 for water purification. The carrier 30 of each of the level-1 biological filter pool 24 and the level-2 biological filter pool 25 is substantially shaped to be a cage; the carrier 30 of the level-1 biological filter pool 24 is used to contain the filamentous fiber net stuffing materials for water purification, and the carrier 30 of the level-2 biological filer pool 25 is used to contain the biochemical ceramic ring stuffing materials for water purification.

Figure 4:
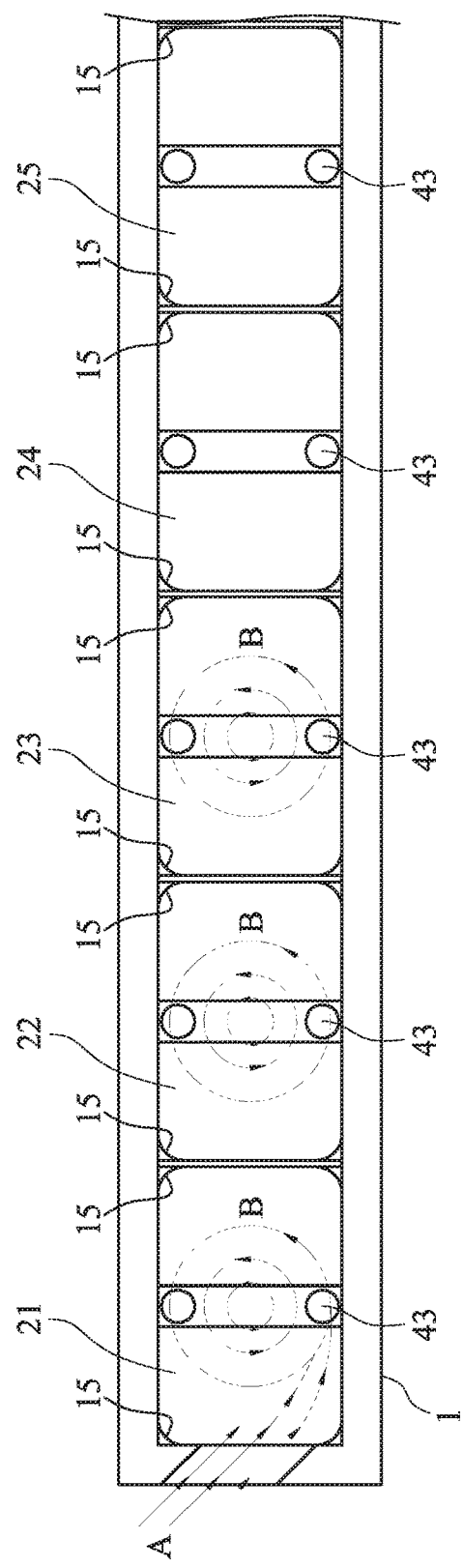
FIG. 4 and FIG. 5 are schematic views of a vortex flow status of the preferred embodiment in accordance with the present invention.
Figure 5:
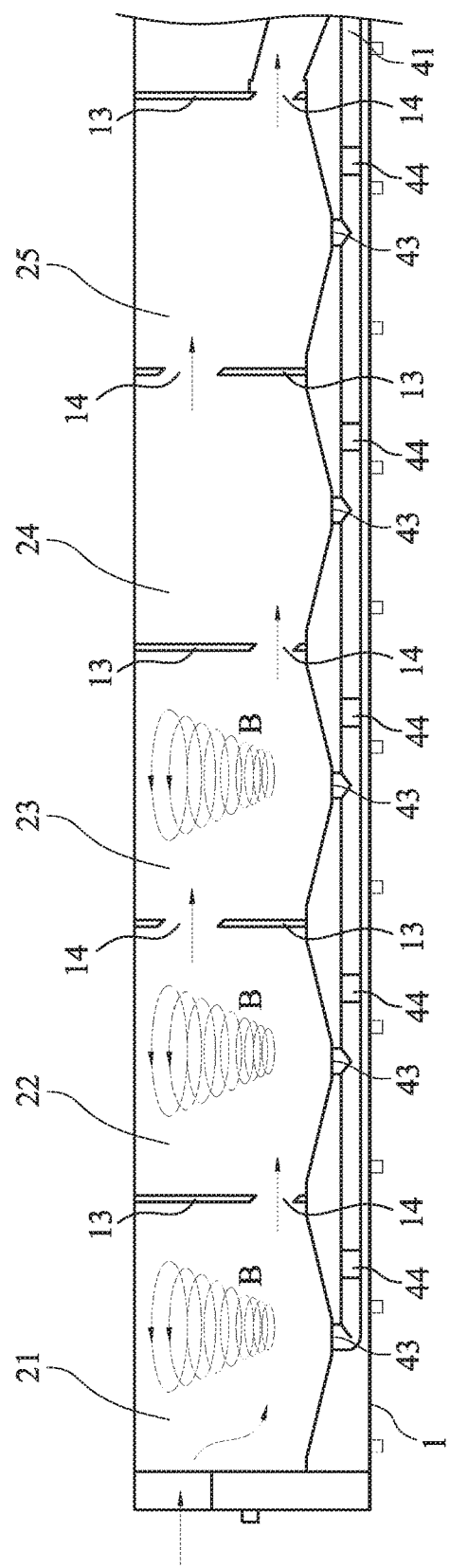

Please further refer to FIG. 4 and FIG. 5, in the embodiment, the baffle boards 13 and the communication holes 14 between the water purification pools are arranged alternatively in the vertical direction, as shown in the figures, the baffle board 13 between the sedimentation pool 21 and the anaerobic pool 22 is at the upper position, and the communication hole 14 is at the lower position; the baffle board 13 between the anaerobic pool 22 and the anoxic pool 23 is at the lower position, and the communication hole 14 is at the upper position, and so on; in this way, the baffle boards 13 and the communication holes 14 can be arranged alternatively in the vertical direction, which can increase the distance of the path which the wastewater flows through during the water purification process, increase the water purification treatment area and better the water purification treatment effect.

Moreover, the water purification tank 1 in the embodiment has the mechanism to form a vortex flow by itself so as to better the water purification effect. In the embodiment, each of the water purification pools has the water deflectors 15 for form the vortex flow; however, the purpose of the above structure is to make the vortex flow mechanism work in the sedimentation pool 21, the anaerobic pool 22 and the anoxic pool 23. As shown in the figures, each of the corners of the sedimentation pool 21, the anaerobic pool 22 and the anoxic pool 23 is provided with a cured water deflector 15, such that the curved surface of the water deflector 15 can connect to the lateral wall to form streamline wall surface; besides, the water inlet is an inclined opening; in this way, the direction A of the water flow being injected from the water inlet 11 to into the sedimentation pool 21 is inclined and directly toward the wall surface, so the water flow can stream along the streamline wall surface to form the vortex flow B. Then, the vortex flow B naturally formed can be continued and stream from the sedimentation pool 21 to the anaerobic pool 22 and the anoxic pool 23.

When the system is actually implemented, the connection and arrangement of the water inlet 11 and water outlet 12, such as connection by pipes, or connecting a plurality of water purification tanks 1 for multiple water treatments, can be modified according to the actual requirements. Of course, it is also possible to directly put the water purification tank 1 in a predetermined water body (e.g. a river, lake or ocean, etc.), and then control the direction of the water flow in the water purification tanks 1 by water pumps in order to make the purified water flow back to the natural water body and then make the water purification process can cycle permanently. The user can purify the natural water body just by periodically cleaning and replacing the carrier 30 of each of the water purification pools.

In a feasible embodiment, the tank body of the water purification tank 1 can be a structure body composed of hollow wall boards; the hollow structure can contain gas with buoyancy, so the water purification tank 1 can float at the proper position on the water in order to better the convenience of using, maintaining and replacing the water purification tank 1. Besides, the thickness and the buoyancy of the hollow wall boards can be adjusted according to actual requirements (for example, the buoyance can be calculated according to the volume and the weight of the water purification tank 1).

Figure 6:
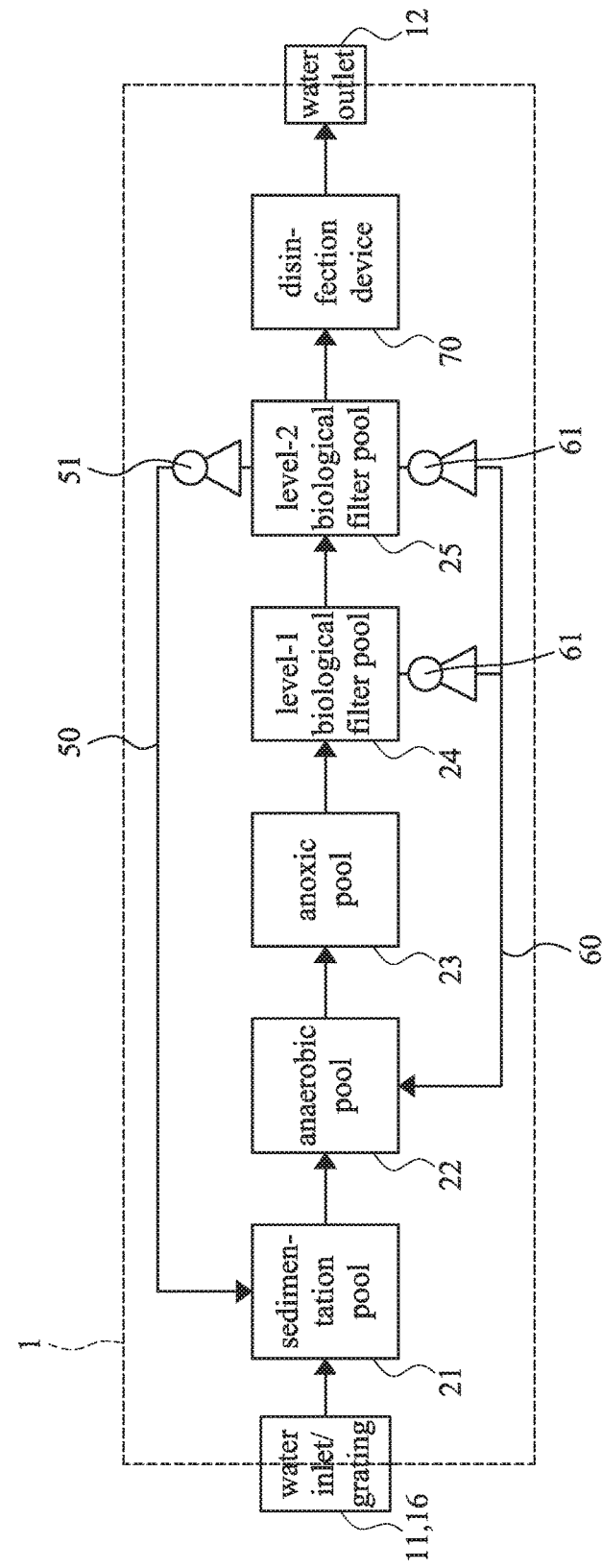
FIG. 6 is a schematic view of another preferred embodiment of a basic structure of a water purification tank in accordance with the present invention.

Please further refer to FIG. 6, in a feasible embodiment, the water purification tank 1 can be provided with a grating 16 at the position of the water inlet 11, which can make the water flow injected from the water inlet 11 pass through the grating 16 in advance in order to filter out the large particles and large suspended matters, which can effectively avoid that the foreign matters and particles (e.g. leaves, broken branches and the like) in the wastewater influence the following reactions and the equipment. Further, the water purification tank 1 can further include a disinfection device 70 disposed at the path between the level-2 biological filter pool 25 and the water outlet 12. The disinfection device 70 at least includes a low-pressure mercury vapor discharge lamp so as to further disinfect the purified water flow; the water flow pass through the path can be further disinfected by ultraviolet light. In this way, the purified water can conform to the water recycling standards of being sprayed over streets, watering green belts and industrial water, etc.; therefore, the quality of the purified water can be obviously improved.

In addition, in a feasible embodiment, the water purification tank 1 can further include a plurality of aeration devices at the level-1 biological filter pool 24 and the level-2 biological filter pool 25, which can promote the water to be combined with the oxygen in the air to obviously increase the oxygen content of the water. The aforementioned aeration device at least includes a gas distribution pipe and a micro-pore aerator.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An ecological biowater purification system comprising at least one water purification tank that comprises:
 a water inlet that admits a water flow into each water purification tank of the at least one water purification tank;
 a water outlet that discharges the water flow from each water purification tank of the at least one water purification tank;
 a water purification device comprising a plurality of water purification pools that communicate with one another and that include:
  a sedimentation pool that communicates with the water inlet;
  an anaerobic pool that communicates with the sedimentation pool;
  an anoxic pool that communicates with the anaerobic pool;
  a level-1 biological filter pool that communicates with the anoxic pool; and
  a level-2 biological filter pool that communicates with the level-1 biological filter and that communicates with the water outlet, each pair of adjacent water purification pools of the plurality of water purification pools having a baffle board and communication hole combination to facilitate communication with one another, each water purification pool of the water purification pools being provided with a carrier that contains a stuffing material for water purification and that is configured to be replaceable;
 a suction device that comprises a plurality of suction nozzles, each suction nozzle of the plurality of suction nozzles being disposed on a respective bottom of each water purification pool; and a plurality of suction pipes, each suction pipe of the plurality of suction pipes being connected to one suction nozzle of the plurality of suction nozzles so as to discharge precipitates out of a respective water purification pool of the at least one water purification pools;
 a first backflow device including a water pump connected between the level-2 biological filter pool and the sedimentation pool to cause a portion of water contained in the level-2 biological filter pool to flow back to the sedimentation pool; and
 a second backflow device including a water pump connected between (1) the level-1 biological filter pool and the level-2 biological filter pool and (2) the anaerobic pool to cause a portion of water contained in the level-1 biological filter pool and in the level-2 biological filter pool to flow back to the anaerobic pool,
 wherein, when the at least one water purification tank comprises more than one water purification tank, the outlet of one water purification tank is connected to the inlet of another water purification tank.

2. The ecological biowater purification system of claim 1, wherein respective carriers of the sedimentation pool, the anaerobic pool and the anoxic pool are each provided with at least one holder configured to hang a plurality of plastic flexible stuffing materials for water purification therefrom.

3. The ecological biowater purification system of claim 2, wherein the carrier of the level-1 biological filter pool contains a filamentous fiber net stuffing material for water purification.

4. The ecological biowater purification system of claim 3, wherein the carrier of the level-2 biological filter pool contains a biochemical ceramic ring stuffing material for water purification.

5. The ecological biowater purification system of claim 4,
 wherein each baffle board has a vertical axis and a respective baffle board and communication hole within each baffle board and communication hole combination is vertically disposed with respect to one another along the vertical axis of the respective baffle board, and
 wherein each baffle board and communication hole combination is arranged to vertically alternate orientation of the baffle board and communication hole with respect to one another along the vertical axis, with respect to adjacent baffle board and communication hole combinations.

6. The ecological biowater purification system of claim 5, wherein the bottom of each the water purification pool has a downgrade and an upgrade, and the suction nozzle thereof is disposed at a lowest position.

7. The ecological biowater purification system of claim 6,
 wherein the sedimentation pool has lateral walls and is provided with a plurality of curved water deflectors connected to the lateral walls to form streamlined wall surfaces, and
 wherein the water inlet is an inclined opening effective to admit the water flow into the sedimentation pool at a predetermined angle to stream along the streamlined wall surfaces and form a vortex flow.

8. The ecological biowater purification system of claim 7, wherein the anaerobic pool and the anoxic pool have respective lateral walls that are provided with a plurality of curved water deflectors connected to the respective lateral walls to form streamlined wall surfaces so that the water flow from the sedimentation pool streams into the anaerobic pool and is a vortex flow within the anaerobic pool and so that the water flow from the anaerobic pool streams into the anoxic pool and is a vortex flow within the anoxic pool.

9. The ecological biowater purification system of claim 1, wherein the water inlet is provided with a grating effective for filtering out suspended matters in the water flow.

10. The ecological biowater purification system of claim 9, further comprising a disinfection device including an ultraviolet light disposed between the level-2 biological filter pool and the water outlet so as to disinfect the water flow by irradiating the water flow with the ultraviolet light.

11. The ecological biowater purification system of claim 2, wherein the water inlet is provided with a grating effective for filtering out suspended matters in the water flow.

12. The ecological biowater purification system of claim 3, wherein the water inlet is provided with a grating effective for filtering out suspended matters in the water flow.

13. The ecological biowater purification system of claim 4, wherein the water inlet is provided with a grating effective for filtering out suspended matters in the water flow.

14. The ecological biowater purification system of claim 13, further comprising a disinfection device including an ultraviolet light disposed between the level-2 biological filter pool and the water outlet so as to disinfect the water flow by irradiating the water flow with the ultraviolet light.

15. The ecological biowater purification system of claim 5, wherein the water inlet is provided with a grating effective for filtering out suspended matters in the water flow.

16. The ecological biowater purification system of claim 15, further comprising a disinfection device including an ultraviolet light disposed between the level-2 biological filter pool and the water outlet so as to disinfect the water flow by irradiating the water flow with the ultraviolet light.

17. The ecological biowater purification system of claim 6, wherein the water inlet is provided with a grating effective for filtering out suspended matters in the water flow.

18. The ecological biowater purification system of claim 17, further comprising a disinfection device including an ultraviolet light disposed between the level-2 biological filter pool and the water outlet so as to disinfect the water flow by irradiating the water flow with the ultraviolet light.

19. The ecological biowater purification system of claim 8, wherein the water inlet is provided with a grating effective for filtering out suspended matters in the water flow.

20. The ecological biowater purification system of claim 19, further comprising a disinfection device including an ultraviolet light disposed between the level-2 biological filter pool and the water outlet so as to disinfect the water flow by irradiating the water flow with the ultraviolet light.

* * * * *